United States Patent
Lim

(10) Patent No.: US 11,924,506 B2
(45) Date of Patent: Mar. 5, 2024

(54) SYSTEM AND METHOD FOR DATA MANAGEMENT IN A MEDIA DEVICE

(71) Applicant: Creative Technology Ltd, Singapore (SG)

(72) Inventor: Boon Liang Stanley Lim, Singapore (SG)

(73) Assignee: CREATIVE TECHNOLOGY LTD., Singapore (SG)

( * ) Notice: Subject to any disclaimer, the term of this patent is extended or adjusted under 35 U.S.C. 154(b) by 264 days.

(21) Appl. No.: 17/431,693

(22) PCT Filed: Feb. 14, 2020

(86) PCT No.: PCT/SG2020/050077
§ 371 (c)(1),
(2) Date: Aug. 17, 2021

(87) PCT Pub. No.: WO2020/171776
PCT Pub. Date: Aug. 27, 2020

(65) Prior Publication Data
US 2022/0141526 A1    May 5, 2022

Related U.S. Application Data

(60) Provisional application No. 62/807,225, filed on Feb. 18, 2019.

(51) Int. Cl.
*H04N 21/439* (2011.01)
*G11B 27/36* (2006.01)
(Continued)

(52) U.S. Cl.
CPC ......... *H04N 21/4392* (2013.01); *G11B 27/36* (2013.01); *H04N 21/44004* (2013.01); *H04N 21/442* (2013.01)

(58) Field of Classification Search
CPC ......... H04N 21/4392; H04N 21/44004; H04N 21/442; G11B 27/36
See application file for complete search history.

(56) References Cited

U.S. PATENT DOCUMENTS

2017/0063692 A1* 3/2017 Roncero Izquierdo ..................... H04N 21/2401

OTHER PUBLICATIONS

CNIPA, Chinese First Office Action dated Mar. 23, 2023 in Application No. 202080014928.9.
(Continued)

*Primary Examiner* — Girumsew Wendmagegn
(74) *Attorney, Agent, or Firm* — SNELL & WILMER L.L.P.

(57) ABSTRACT

It is common that in an audio system, there are multiple data rates that need to be synchronized. For example, a sending device has its own crystal or clock, and a receiving device has another. Typical solutions introduce a lot of latency. According to various embodiments of the invention, a data management mechanism and technique are presented. The data management mechanism and technique pertains to managing media data such as those in an audio system, for example, managing the consumption of digital audio data in USB audio. The data management mechanism may include a dynamic buffer, which can be automatically controlled and adjusted to address issues (e.g., latency) in data consumption.

9 Claims, 5 Drawing Sheets

(51) Int. Cl.
*H04N 21/44* (2011.01)
*H04N 21/442* (2011.01)

(56) References Cited

OTHER PUBLICATIONS

CNIPA, Notification of Registration and Granting a Patent Right dated Sep. 27, 2023 in Application No. 202080014928.9.

* cited by examiner

SYSTEM AND METHOD FOR DATA MANAGEMENT IN A MEDIA DEVICE

CROSS REFERENCES TO RELATED APPLICATIONS

This application is a National Stage (§ 371) of International Application No. PCT/SG2020/050077, filed 14 Feb. 2020 and entitled "SYSTEM AND METHOD FOR DATA MANAGEMENT IN A MEDIA DEVICE", which claims the benefit of U.S. Provisional Application No. 62/807,225, filed 18 Feb. 2019 and entitled "SYSTEM AND METHOD FOR DATA MANAGEMENT IN A MEDIA DEVICE", the disclosure of which is herein incorporated by reference in its entirety.

BACKGROUND OF THE INVENTION

1. Field of the Invention

The present invention relates to data management. More particularly, the present invention relates to a system and method for data management in a media device.

2. Description of the Related Art

In audio systems, there is often a need to synchronize audio data between the host (producer) and playback device (consumer). Sometimes, the host may stop sending audio data for a period of time to the playback device and this causes problems such as unintended audio being played back (ring buffer overrun). A typical solution to the problems is to use a buffer; however, it is of a pre-determined size and adds a fixed amount of latency that could be undesirable in low latency audio systems.

Accordingly, there is a need for a system and method for data management in a media device that addresses the above problems, especially in media systems where low latency is desired.

SUMMARY OF THE INVENTION

In one aspect of the invention, a method for data management in a media device in low latency systems is provided. The media device includes a first memory handler and a second memory handler with acceptable gap times in processing a media stream. The method includes: 1) initiating receipt of the media stream having media data; 2) detecting missing media data in the media stream; and 3) dynamically conditioning the first and second memory handlers to maintain the acceptable gap times to process the media stream.

According to various embodiments, the first memory handler is associated with a fixed size memory handler and the second memory handler is associated with a dynamically adjustable size memory handler. Further, according to one embodiment, dynamically conditioning the first and second memory handlers includes: 1) returning to the detecting step if missing media data is not detected; 2) feeding media data to the first memory handler from the second memory handler if missing media data is detected; and 3) determining whether the second memory handler is depleted such that: 1) if second memory handler is depleted, increasing the second memory handler size and initiating a recovery of the second memory handler; and 2) wherein if second memory handler is not depleted, initiating a recovery of the second memory handler. Yet, according to another embodiment, dynamically conditioning the first and second memory handlers includes: 1) returning to the detecting step if missing media data is not detected; 2) feeding media data to the first memory handler from the second memory handler if missing media data is detected; and 3) determining whether the second memory handler is depleted such that: 1) if the second memory handler is depleted, increasing the second memory handler size and initiating a recovery of the second memory handler; and 2) if the second memory handler is not depleted, determining whether second memory handler has depleted less than threshold such that: 1) if the second memory handler has depleted less than threshold, reducing the second memory handler size and initiating a recovery of the second memory handler; and 2) if the second memory handler has not depleted less than threshold, initiating a recovery of the second memory handler.

In another aspect of the invention, a system for data management in a media device in low latency systems is provided. The system includes: 1) a media input output interface for receiving a media stream; 2) a first memory handler with a first acceptable gap time in processing the media stream; 3) a second memory handler with a second acceptable gap time in processing the media stream; and 4) a processor for dynamically conditioning the first and second memory handlers to maintain the acceptable gap times to process the media stream.

The invention extends to a machine readable medium embodying a sequence of instructions that, when executed by a machine, cause the machine to carry out any of the methods described herein.

Some of the advantages of the present invention include: 1) automatic adjustments of the second memory handler size to minimize latency in the system; 2) substantially no artifacts in the output; 3) real-time implementation; 4) robust processing of and adaptability to various media data loss between producer and consumer. These and other features and advantages of the present invention are described below with reference to the drawings.

DETAILED DESCRIPTION OF PREFERRED EMBODIMENTS

Reference will now be made in detail to preferred embodiments of the invention. Examples of the preferred embodiments are illustrated in the accompanying drawings. While the invention will be described in conjunction with these preferred embodiments, it will be understood that it is not intended to limit the invention to such preferred embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known mechanisms have not been described in detail in order not to unnecessarily obscure the present invention.

It should be noted herein that throughout the various drawings like numerals refer to like parts. The various drawings illustrated and described herein are used to illustrate various features of the invention. To the extent that a particular feature is illustrated in one drawing and not another, except where otherwise indicated or where the structure inherently prohibits incorporation of the feature, it is to be understood that those features may be adapted to be included in the embodiments represented in the other figures, as if they were fully illustrated in those figures. Unless otherwise indicated, the drawings are not necessarily to scale. Any dimensions provided on the drawings are not intended to be limiting as to the scope of the invention but merely illustrative.

It is common that in an audio system, there are multiple data rates that need to be synchronized. For example, a sending device has its own crystal or clock, and a receiving device has another. Typical solutions introduce a lot of latency. According to various embodiments of the invention, a data management mechanism and technique are presented. The data management mechanism and technique pertains to managing media data such as those in an audio system, for example, managing the consumption of digital audio data in USB audio. The data management mechanism may include a dynamic buffer, which can be automatically controlled and adjusted to address issues (e.g., latency) in data consumption. Therefore, the present invention is advantageous for systems with low latency. For systems with video playback, the requirement of maximum audio latency before audio video sync issues can be seen would be below 50 ms. In a pure audio system, there may be more tolerance to the latency as there is no visual component that needs to be synced to.

Figure 1A:
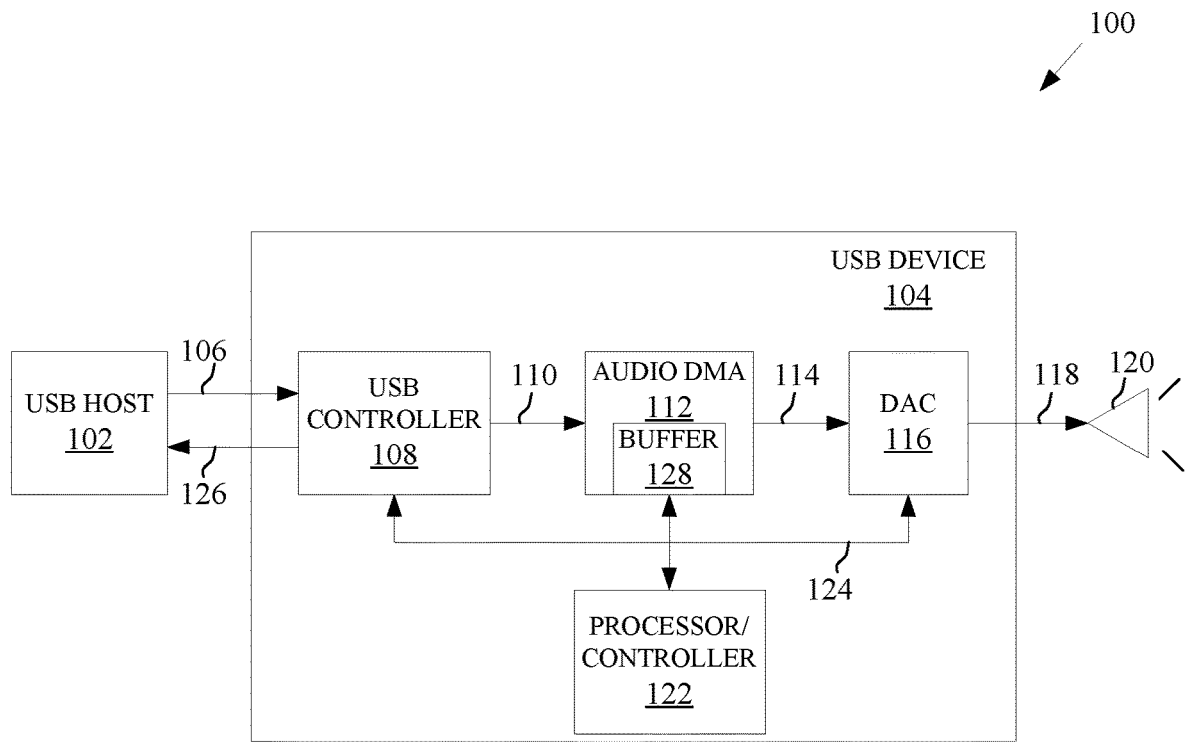
FIG. 1A is a schematic block diagram illustrating a system for data management in a media device according to various embodiments of the present invention.

FIG. 1A is a schematic block diagram illustrating a system 100 for data management in a media device 104 according to various embodiments of the present invention. The system 100 may be a complete media system (e.g., audio/video systems) or any portion thereof. For illustrative purposes, system 100 relates to a USB audio system that includes USB host 102 coupled to USB device 104 and speaker 120. USB host 102 (also known as Producer, Source) is operable to send USB audio data (e.g., stream of packets) 106 to USB device 104 (also known as Consumer, Sink), which includes USB controller 108, Audio DMA (Direct Memory Access) 112, DAC (Digital Analog Converter) 116, and processor/controller 122. USB audio data 106 is received at USB device 104 by USB controller 108, which then transfers 110 it to Audio DMA 112, which then transfers 114 it to DAC 116, which then sends 118 it to speaker 120 for playback. USB controller 108, Audio DMA 112, DAC 116, and processor/controller 122 are also communicatively coupled 124 with each other where processor/controller 122 is configured for managing the data in USB device 104.

USB host 102 can be any USB audio source device, which typically includes a processor, such as a personal computer, mobile phone, or gaming console. USB device 104 can be any USB connectable device such as an USB external soundcard, USB DAC, or USB speaker. Audio DMA 112 is operable to manage memory access and includes a controller (not shown) and memory (e.g., RAM) such as a buffer 128. Any portion of USB device 104 may be implemented separately or together with other portions on a system on a chip.

Due to a multi-process synchronization problem (e.g., producer-consumer problem; bounded-buffer problem; different clocks between USB host and USB device), a preferred embodiment includes a feedback output 126 for USB device 104 to communicate with USB host 102. Output 126 may include Asynchronous (ASYNC) feedback, which notifies USB host 102 to send more or less samples to resolve any synchronization problems. For example, it can be used to notify USB host 102 to send more samples because USB device is running low on samples. However, some USB hosts may not respond to ASYNC feedback. In this case, USB device 104 will internally (depending on the circumstances) either add or drop a sample at certain points in time so that the producer rate and consumer rate matches.

Figure 1B:
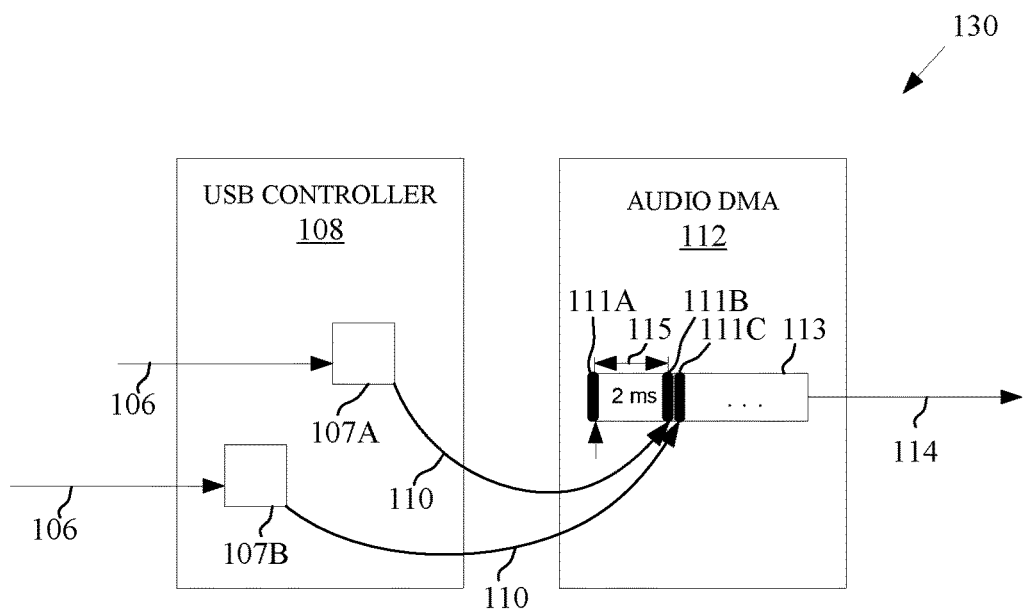
FIG. 1B is a detailed portion view of the system in FIG. 1A according to various embodiments of the present invention.

FIG. 1B is a detailed portion view 130 of system 100 in FIG. 1A according to various embodiments of the present invention. As shown, sequential serial chronological packets 107A (top) and 107B (bottom) of USB audio data 106 are received by USB controller 108 and transferred 110 or copied to a memory handler 113 (which can be implemented with any one or combination of buffer 128, register, register table, RAM, memory software, and memory hardware that is suitable for the present invention) within Audio DMA 112 at respective chronological positions 111B and 111C at end of queue and eventually played out via 114. Positions 111A and 111B are time separated from each other by a gap time. According to various embodiments, gap time 115 is predetermined and is the time between the USB audio data and the Audio playback data. In a preferred embodiment, gap time should be as short as possible, for example 2 ms. In this case, the audio latency is 2 ms because of the 2 ms gap time in Audio DMA 112.

To further elaborate, Audio DMA 112 generally starts playing off at pointer at position 111A, but the actual data coming in will be copied to a position where it will play out after 2 ms. This 2 ms play out is done to allow some leeway for adjustments to mitigate any synchronization problem. This 2 ms gap time is customizable as defined by each USB device 104. However, for low latency audio systems, gap time should be minimized. An increase in gap time will affect the latency of the audio system and possibly cause listening issues.

Figure 2:
FIG. 2 is a state diagram illustrating different states during data management in a media device.

FIG. 2 is a state diagram 200 illustrating different states during data management in a media device. Some USB devices 104 may have a phenomenon that includes transitioning between various states such as receiving valid data 202 to receiving a break in data 204 to receiving silent data 206 and back to receiving valid data 208. Another phenomenon includes receiving valid data 202 to receiving a break in data 204 and back to receiving valid data 208. Each phenomenon occurs when there is a break in the audio data delivery from USB host 102. Some USB devices 104 may not have any such phenomenon occur due to their large enough fixed sized buffers to address the break in delivery since their time gaps are large enough to allow adjustments to be done so that the gap will not be reduced until the read and write pointers cross each other. For example, buffer 128 within Audio DMA 112 can be set from 2 ms to 20 ms or to 40 ms.

In normal conditions, USB host 102 should be sending out USB audio data 106 at a constant rate. For instance, as shown in FIG. 2, a continuous stream of valid data 202 with 1 ms worth of audio data is sent over to USB device 104. However, some USB host 102 may experience a break in delivery (e.g., from 2-10 ms) due to various reasons, one of them being that the processor in USB host 102 is busy servicing other stuff and therefore "delayed" the transmission of the USB audio data. This break in delivery is problematic since the audio data within Audio DMA 112 could eventually be depleted despite having an incorporated gap time (e.g., 2 ms) that is adjustable. So if there is no data sent from USB host 106 or received by USB controller 108, there is nothing to copy into Audio DMA 112. Yet, the audio will continue to be played in Audio DMA 112; thus, causing the gap time to get smaller and smaller. Eventually, if non-delivery of audio data from USB host 102 is more than the gap time (e.g., 2 ms), the read and write pointers in Audio DMA 112 will cross over and result in an undesirable effect.

To further elaborate, the read pointer should normally be before/below the write pointer (in this case, 2 ms before). So in non-delivery of audio data, the read pointer gets closer to the write pointer. With even more non-delivery, the read pointer will go above the write pointer. This means that the write pointer is falling back one whole read buffer, so it would be necessary to play the whole read buffer to reach the read pointer. But in this case, the wrong data will be played and result in incorrect audio.

Although USB device 104 may implement a large buffer to address this break in delivery problem, the large buffer is sometimes not conducive in systems where low latency is desired. Nevertheless, the following two methods are available to mitigate the issue of loss data (e.g., non-delivery; break in delivery): 1) Adjusting Audio DMA 112 latency (e.g., 2 ms playback gap between USB controller 108 and Audio DMA 112); and 2) Adding an intermediate buffer with fixed size that is big enough to handle the break in delivery problem.

Figure 3:
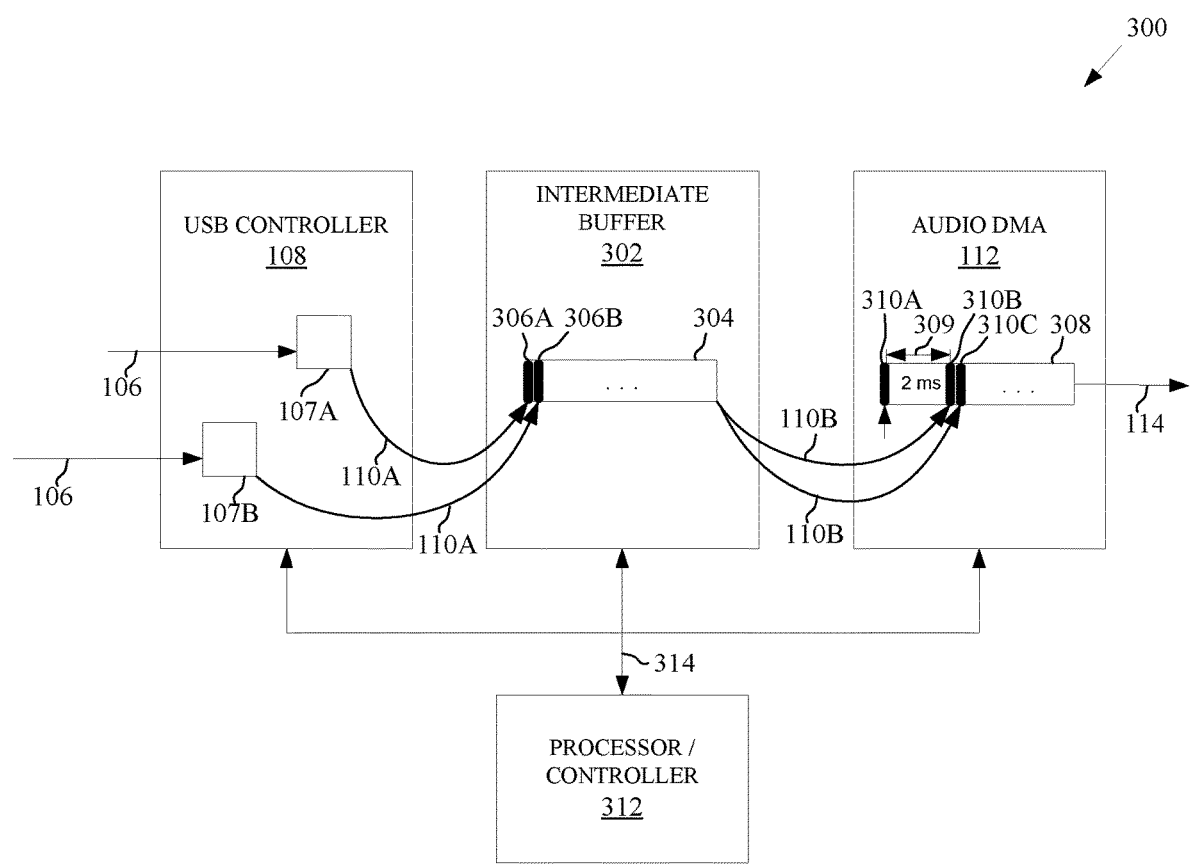
FIG. 3 is a schematic block diagram illustrating a system for data management in a media device according to various embodiments of the present invention.

FIG. 3 is a schematic block diagram illustrating a system 300 for data management in a media device 104 according to various embodiments of the present invention. It should be noted that system 300 can be incorporated within system 100 or USB device 104. As shown, sequential serial chronological packets 107A (top) and 107B (bottom) of USB audio data 106 are received by USB controller 108 and transferred 110A or copied to a memory handler 304 (which can be implemented with any one or combination of a buffer, register, register table, RAM, memory software, and memory hardware that is suitable for the present invention) within Intermediate Buffer 302 at respective chronological positions 306A and 306B at end of queue and eventually transferred or copied out via 110B to a memory handler 308 (which can be implemented with any one or combination of buffer 128, register, register table, RAM, memory software, and memory hardware that is suitable for the present invention) within Audio DMA 112 at respective chronological positions 310B and 310C at end of queue and eventually played out via 114. According to various embodiments, gap time 309 is predetermined and is the time between the USB audio data and the Audio playback data. In a preferred embodiment, gap time should be as short as possible, for example 2 ms.

To further elaborate, Intermediate Buffer 302 and Audio DMA 112 generally starts playing off at pointer 310A, but the actual data coming in will be copied to a position where it will play out after 2 ms. This 2 ms play out is done to allow some leeway for adjustments to mitigate any synchronization problem. This 2 ms gap time is customizable as defined by each USB device 104. However, for low latency audio systems, gap time should be minimized. An increase in gap time will affect the latency of the audio system and possibly cause listening issues.

An advantage of using Intermediate Buffer 302 is that it can mitigate the issue of audio delivery loss without having the read and write pointers crossing each other. This is because Intermediate Buffer 302 is operable to have its size dynamically and/or automatically adjusted in real time. The adjustment in size will be based on addressing any multi-process synchronization problems or non-delivery of audio data problems. In a preferred embodiment, the adjustment will minimize the latency in the system. Intermediate Buffer 302 can be implemented as memory (e.g., RAM). Further, Intermediate Buffer 302 together with USB controller 108, Audio DMA 112, and processor/controller 312 are communicatively coupled 314 with each other where processor/controller 312 is configured for managing the data in USB device 104. According to various embodiments of the present invention, processor/controller 312 is configured for performing data management in a media device according to the flow diagram 400 in FIG. 4.

Under normal conditions with the present invention implemented in USB device 104, audio data flow will pass through USB controller 108, then Intermediate Buffer 302, then Audio DMA 112, then DAC 116. Further, processor/controller 312 can be the same or separate from processor/controller 122.

Figure 4:
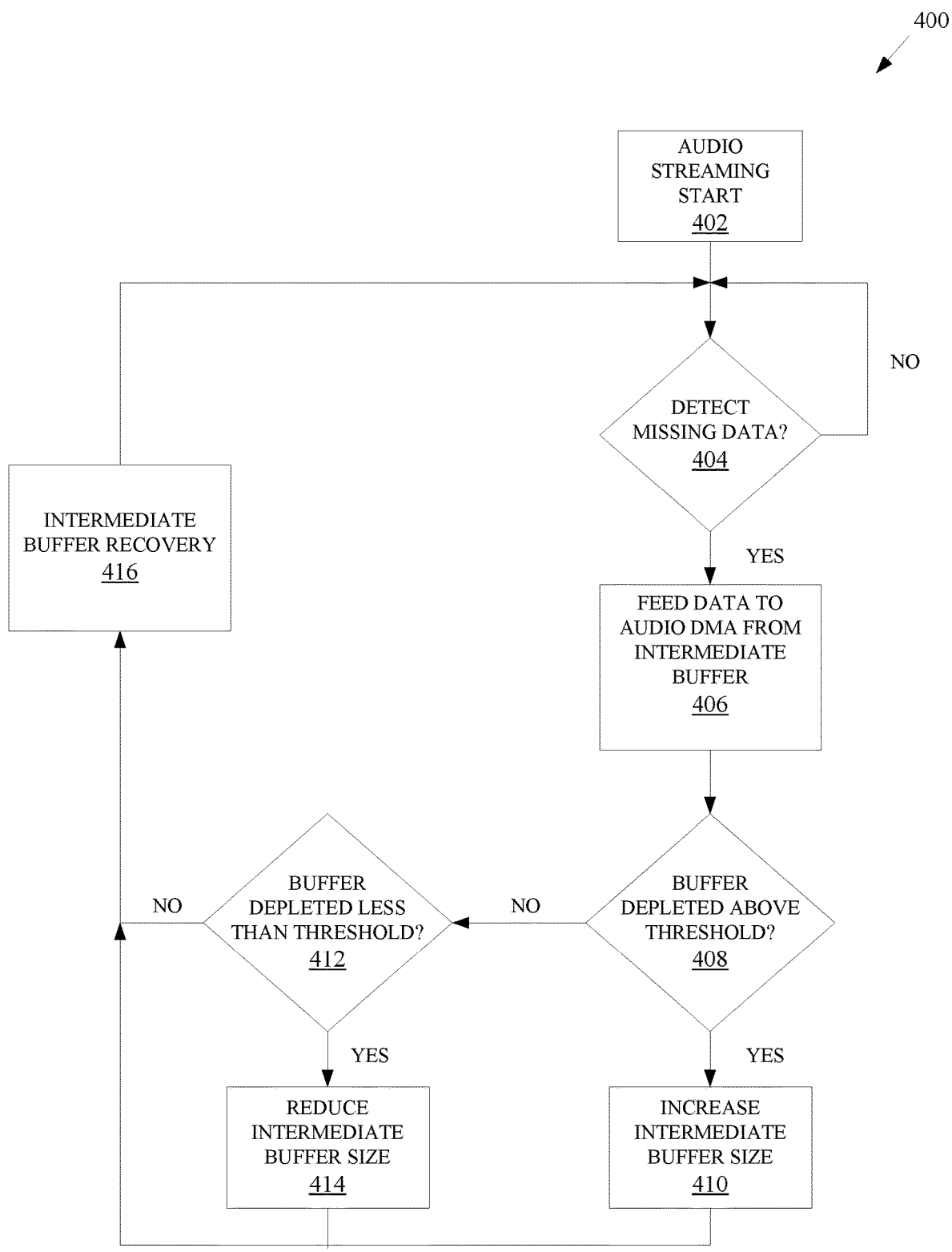
FIG. 4 is a flow diagram for data management in a media device according to various embodiments of the present invention.

FIG. 4 is a flow diagram 400 for data management in a media device 104 according to various embodiments of the present invention. Flow diagram 400 can be performed in real time.

At step 402, initiating audio streaming between USB host 102 and USB device 104 is performed. After performing step 402, proceed to step 404.

At step 404, determining/detecting whether there is missing data is performed. This includes determining whether there is a non-delivery of audio data. Any technique may be used to perform this determination. For example, this can be done by looking at a threshold gap time. That is, once the threshold gap time is reached, audio data delivery can be classified as unreliable (e.g., not being sent from the USB host). If determination is negative, then proceed to perform step 404 again. If determination is positive, then proceed to step 406.

At step 406, feeding audio data to Audio DMA 112 from Intermediate Buffer 302 is performed. By feeding audio data to Audio DMA 112, the non-delivery of audio data issues can be addressed so long as there is data there to play out. Feeding audio data from Intermediate Buffer 302 to Audio DMA 112 is an attempt to get the gap to an acceptable level. In this scenario, the USB controller 108 has no more audio data coming in. Instead, only audio data from the Intermediate Buffer 302 will be sent to Audio DMA 112. After performing step 406, proceed to step 408.

At step 408, determining whether intermediate buffer has depleted above threshold is performed. Step 408 may include determining whether intermediate buffer streaming average of data used during each occurrence of missing audio data crossed above a threshold (e.g., more than 95% of the current intermediate buffer size) or if the buffer is completely depleted a predetermined number of times (e.g., depleted one time). If this determination is negative, then proceed to step 412. If determination is positive, then proceed to step 410.

At step 410, increasing intermediate buffer size (by a certain multiple or percentage) is performed. Step 410 may also include recalculating and setting the next threshold used in step 408. Some hysteresis needs to be applied in the determination of threshold to increase or decrease the intermediate buffer so that the size of the buffer does not bounce up and down in quick succession. By increasing the intermediate buffer to buffer more data, the increase is done with the intention to buffer enough data so that when the missing data occurs again, the buffered data would be long enough to mitigate the issue. After performing step 410, proceed to step 416.

At step 412, determining whether intermediate buffer has depleted less than threshold is performed. Step 412 may include calculating the streaming average of the amount of data that is depleted on each occurrence of missing audio data and determining whether this average has fallen below a threshold of the current intermediate buffer size (e.g., less than 70% of intermediate buffer size). Another method of determination would be to count the number of times where the buffer has depleted less than a pre-determined amount (e.g., ⅔ of the buffer size) for a pre-determined number of times. If this determination is negative, then proceed to step 416. If determination is positive, then proceed to step 414.

At step 414, reducing intermediate buffer size (by a certain multiple or percentage) is performed. Step 414 may also include recalculating and setting the next threshold used in step 412. Some hysteresis needs to be applied in the determination of threshold to increase or decrease the intermediate buffer so that the size of the buffer does not bounce up and down in quick succession. After performing step 414, proceed to step 416.

At step 416, initiating an intermediate buffer recovery is performed. Recovery can be done by filling up the intermediate buffer to original gap time (e.g., 2 ms) via: 1) ASYNC feedback; and 2) Artificially adding samples [e.g., receiving audio packet of 1 ms worth and taking the last sample of the packet (at 48 kHz sample, then 1/48K) to feed back into it]. ASYNC feedback has no guarantee that USB host can fill up the Intermediate Buffer fast enough (before the next occurrence of missing audio data) as it is dependent on the USB Host to send the additional data, therefore, artificially adding samples would help to fill up the Intermediate Buffer in a much shorter time. Recovery is useful where the Intermediate Buffer has been increased, but may not be filled up to original gap since there is already audio data loss. Recovery is useful to fill up the Intermediate Buffer again while all this data is coming in. Step 416 is performed regardless of whether intermediate buffer is depleted or not. After performing step 416, proceed back to step 404.

Flow diagram 400 covers two scenarios: 1) increase intermediate buffer size; and 2) decrease intermediate buffer size. There is an adjustable threshold in step 412 that can indicate a level of emptiness (e.g., ⅓ empty). Upon the determination in 412, the processor/controller 312 can reduce the size of the intermediate buffer 302 in order to correspondingly reduce the latency. If intermediate buffer 302 is over allocated, it is advantageous to be able to reduce the size so that the latency in the system is reduced. For example, if missing audio is detected and the intermediate buffer size is increased from 2 ms to 4 ms to 8 ms to 16 ms where it can now handle the audio non-delivery, issue, then processor/controller 312 can go monitor the intermediate buffer whenever there is missing data. This monitoring can fine tune the ideal size/time (e.g., 10 ms compared to 16 ms) for minimal latency in low latency systems.

According to some embodiments, flow diagram 400 includes feeding audio data from Intermediate Buffer 302 to Audio DMA 112 to try to get this gap to an acceptable gap. In this scenario, the USB controller has no more audio data coming in. Instead, only audio data from Intermediate Buffer 302 will be sent to Audio DMA 112. The audio data in the Intermediate Buffer 302 will eventually get depleted. If depleted and the non-delivery goes less than or equal to the acceptable gap time of 2 ms, everything is fine because USB controller 108 gets audio data and Intermediate Buffer 302 gets filled up again. If depleted and more than 2 ms, we artificially send samples (e.g., silent data) into the Audio DMA to maintain the gap. This is because if there is no more data in the Audio DMA, the same problem as noted earlier happens. At the same time if Intermediate Buffer has been depleted in this scenario, which is when all the audio data in the Intermediate Buffer is used up, then the system can be temporarily classified as unreliable and needing a bigger buffer. As such, Intermediate Buffer 302 can be increased on the next round when data starts coming in again. So it means the 2 ms will increase another 2 ms to 4 ms.

Figure 5:
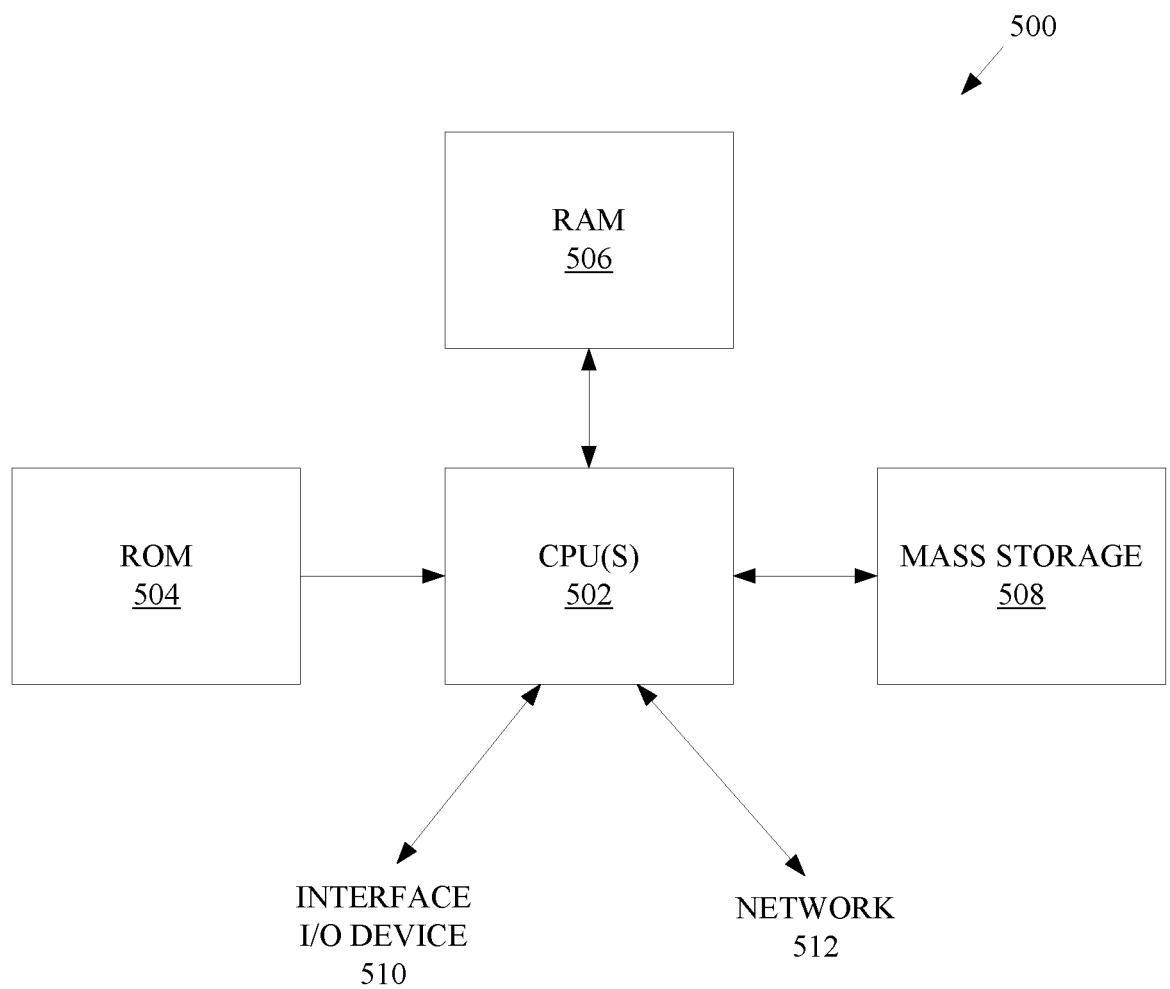
FIG. 5 illustrates a typical computer system that can be used in connection with one or more embodiments of the present invention.

This invention also relates to using a computer system according to one or more embodiments of the present invention. FIG. 5 illustrates a typical computer system 500 that can be used in connection with one or more embodiments of the present invention. The computer system 500 includes one or more processors 502 (also referred to as central processing units, or CPUs) that are coupled to storage devices including primary storage 506 (typically a random access memory, or RAM) and another primary storage 504 (typically a read only memory, or ROM). As is well known in the art, primary storage 504 acts to transfer data and instructions uni-directionally to the CPU and primary storage 506 is used typically to transfer data and instructions in a bi-directional manner. Both of these primary storage devices may include any suitable computer-readable media, including a computer program product comprising a machine readable medium on which is provided program instructions according to one or more embodiments of the present invention.

A mass storage device 508 also is coupled bi-directionally to CPU 502 and provides additional data storage capacity and may include any of the computer-readable media, including a computer program product comprising a machine readable medium on which is provided program instructions according to one or more embodiments of the present invention. The mass storage device 508 may be used to store programs, data and the like and is typically a secondary storage medium such as a hard disk that is slower than primary storage. It will be appreciated that the information retained within the mass storage device 508, may, in appropriate cases, be incorporated in standard fashion as part of primary storage 506 as virtual memory. A specific mass storage device such as a CD-ROM may also pass data uni-directionally to the CPU.

CPU 502 also is coupled to an interface 510 that includes one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 502 optionally may be coupled to a computer or telecommunications network using a network connection as shown generally at 512. With such a network connection, it is contemplated that the CPU might receive information from the network, or might output information to the network in the course of performing the above-described method steps. The above-described devices and materials will be familiar to those of skill in the computer hardware and software arts.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims. For example, the invention can be adapted for any system where there is a producer and consumer problem. These systems may include but not limited to wireless audio such as Bluetooth audio.

In one aspect of the invention, a method for data management in a media device in low latency systems is provided. The media device includes an initial intermediate buffer that stores the data from the host and also supply the media playback output stream in a FIFO method. The method includes: 1) initiating receipt of the media stream having media data; 2) detecting missing media data in the media stream; and 3) dynamically conditioning the intermediate buffer to maintain the acceptable gap times to process the media stream.

According to various embodiments, the intermediate buffer is a dynamically adjustable size buffer. Further, according to one embodiment, dynamically conditioning the intermediate buffer includes: 1) returning to the detecting step if missing media data is not detected; 2) if missing media data is detected, continue to feed the media playback stream from the intermediate buffer so that the gap times are maintained; and 3) determining whether the intermediate buffer is depleted such that: 1) if the intermediate buffer is depleted, increasing the buffer size and initiate a recovery of the intermediate buffer; and 2) wherein if intermediate buffer is not depleted, the recovery of the intermediate buffer will be initiated. Yet, according to another embodiment, dynamically conditioning the intermediate buffer includes: 1) returning to the detecting step if missing media data is not detected; 2) if missing media data is detected, continue to feed the media playback stream from the intermediate buffer so that the gap times are maintained; and 3) determining whether the intermediate buffer is depleted such that: 1) if the intermediate buffer is depleted, increasing the buffer size and initiating the recovery of the intermediate buffer; and 2) if the intermediate buffer is not depleted, determining whether intermediate buffer has depleted less than a pre-defined threshold such that: 1) if the intermediate buffer has depleted less than threshold, reducing the intermediate buffer size and initiating a recovery of the intermediate buffer; and 2) if the intermediate buffer has not depleted less than the pre-defined threshold, the recovery of the intermediate buffer will be initiated.

In another aspect of the invention, a system for data management in a media device in low latency systems is provided. The system includes: 1) a media input output interface for receiving a media stream; 2) an intermediate buffer with an initial acceptable gap time in processing the media stream; and 3) a processor for dynamically conditioning the intermediate buffer to maintain the acceptable gap times to process the media stream.

The invention extends to a machine readable medium embodying a sequence of instructions that, when executed by a machine, cause the machine to carry out any of the methods described herein.

Some of the advantages of the present invention include: 1) automatic adjustments of the intermediate buffer size to minimize latency in the system; 2) substantially no artifacts in the output; 3) real-time implementation; 4) robust processing of and adaptability to various media data loss between producer and consumer.

What is claimed is:

1. A method for data management in a media device in low latency systems, the media device having a first memory handler and a second memory handler with an acceptable gap time in processing a media stream, the method comprising:
    initiating receipt of the media stream having media data;
    detecting missing media data in the media stream; and
    dynamically conditioning the first memory handler and the second memory handler to maintain the acceptable gap time to process the media stream,
    wherein the first memory handler includes a first memory and the second memory handler includes a second memory,
    wherein the first memory is associated with a fixed size memory and the second memory is associated with a dynamically adjustable size memory, and
    wherein the first memory is different than the second memory.

2. The method as recited in claim 1, wherein dynamically conditioning the first and second memory handlers comprises:
    wherein if missing media data is not detected, returning to the detecting step;
    wherein if missing media data is detected, feeding media data to the first memory handler from the second memory handler; and
    determining whether the second memory handler has depleted above a first threshold,
        wherein if second memory handler has depleted above the first threshold, increasing the second memory handler size and initiating a recovery of the second memory handler; and
        wherein if second memory handler has not depleted above the first threshold, initiating a recovery of the second memory handler.

3. The method as recited in claim 1, wherein dynamically conditioning the first and second buffers comprises:
    wherein if missing media data is not detected, returning to the detecting step;
    wherein if missing media data is detected, feeding media data to the first buffer from the second memory handler; and
    determining whether the second memory handler has depleted above a first threshold,
        wherein if the second memory handler has depleted above the first threshold, increasing the second memory handler size and initiating a recovery of the second memory handler; and
        wherein if the second memory handler has not depleted above the first threshold, determining whether second memory handler has depleted less than a second threshold,
            wherein if the second memory handler has depleted less than the second threshold, reducing the second memory handler size and initiating a recovery of the second memory handler; and
            wherein if the second memory handler has not depleted less than the second threshold, initiating a recovery of the second memory handler.

4. A system for data management in a media device in low latency systems, the system comprising:
- a media input output interface for receiving a media stream;
- a first memory handler with a first acceptable gap time in processing the media stream;
- a second memory handler with a second acceptable gap time in processing the media stream; and
- a processor for dynamically conditioning the first memory handler and the second memory handler to maintain the acceptable gap time to process the media stream,
- wherein the first memory handler includes a first memory and the second memory handler includes a second memory,
- wherein the first memory is associated with a fixed size memory and the second memory is associated with a dynamically adjustable size memory, and
- wherein the first memory is different than the second memory.

5. The system as recited in claim 4, wherein dynamically conditioning the first and second memory handlers comprises:
- wherein if missing media data is not detected, returning to the detecting step;
- wherein if missing media data is detected, feeding media data to the first memory handler from the second memory handler; and
- determining whether the second memory handler is depleted,
  - wherein if second memory handler is depleted, increasing the second memory handler size and initiating a recovery of the second memory handler; and
  - wherein if second memory handler is not depleted, initiating a recovery of the second memory handler.

6. The system as recited in claim 4, wherein dynamically conditioning the first and second memory handlers comprises:
- wherein if missing media data is not detected, returning to the detecting step;
- wherein if missing media data is detected, feeding media data to the first memory handler from the second memory handler; and
- determining whether the second memory handler is depleted,
  - wherein if the second memory handler is depleted, increasing the second memory handler size and initiating a recovery of the second memory handler; and
  - wherein if the second memory handler is not depleted, determining whether second memory handler has depleted less than threshold,
    - wherein if the second memory handler has depleted less than threshold, reducing the second memory handler size and initiating a recovery of the second memory handler; and
    - wherein if the second memory handler has not depleted less than threshold, initiating a recovery of the second memory handler.

7. A computer program product for data management in a media device in low latency systems, the media device having a first memory handler and a second memory handler with acceptable gap times in processing a media stream, the computer program product being embodied in a non-transitory computer readable medium and comprising computer executable instructions for:
- initiating receipt of the media stream having media data;
- detecting missing media data in the media stream; and
- dynamically conditioning the first memory handler and the second memory handler to maintain the acceptable gap time to process the media stream,
- wherein the first memory handler includes a first memory and the second memory handler includes a second memory,
- wherein the first memory is associated with a fixed size memory and the second memory is associated with a dynamically adjustable size memory, and
- wherein the first memory is different than the second memory.

8. The computer program product as recited in claim 7, wherein dynamically conditioning the first and second memory handlers comprises:
- wherein if missing media data is not detected, returning to the detecting step;
- wherein if missing media data is detected, feeding media data to the first memory handler from the second memory handler; and
- determining whether the second memory handler is depleted,
  - wherein if second memory handler is depleted, increasing the second memory handler size and initiating a recovery of the second memory handler; and
  - wherein if second memory handler is not depleted, initiating a recovery of the second memory handler.

9. The computer program product as recited in claim 7, wherein dynamically conditioning the first and second memory handlers comprises:
- wherein if missing media data is not detected, returning to the detecting step;
- wherein if missing media data is detected, feeding media data to the first memory handler from the second memory handler; and
- determining whether the second memory handler is depleted,
  - wherein if the second memory handler is depleted, increasing the second memory handler size and initiating a recovery of the second memory handler; and
  - wherein if the second memory handler is not depleted, determining whether second memory handler has depleted less than threshold,
    - wherein if the second memory handler has depleted less than threshold, reducing the second memory handler size and initiating a recovery of the second memory handler; and
    - wherein if the second memory handler has not depleted less than threshold, initiating a recovery of the second memory handler.

\* \* \* \* \*